United States Patent [19]

Fujisawa

[11] Patent Number: 5,523,891

[45] Date of Patent: Jun. 4, 1996

[54] OBJECTIVE LENS DRIVING DEVICE AND METHOD FOR PRODUCING RESILIENT SUPPORTING MEMBER PROVIDED IN OBJECTIVE LENS DRIVING DEVICE

[75] Inventor: Hirotoshi Fujisawa, Tokyo, Japan

[73] Assignee: Sony Corporation, Tokyo, Japan

[21] Appl. No.: 360,313

[22] Filed: Dec. 21, 1994

[30] Foreign Application Priority Data

Dec. 28, 1993 [JP] Japan .................................. 5-351423

[51] Int. Cl.$^6$ ............................... G02B 7/02; G11B 7/00
[52] U.S. Cl. ........................ 359/813; 359/814; 369/44.15
[58] Field of Search ................................ 359/813, 814, 359/823, 824; 369/44.15, 44.16

[56] References Cited

U.S. PATENT DOCUMENTS

| | | | |
|---|---|---|---|
| 4,385,373 | 5/1983 | Howe | 369/44.15 |
| 4,878,214 | 10/1989 | Hinotani | 359/814 |
| 5,007,712 | 4/1991 | Kikuchi et al. | 359/813 |
| 5,073,883 | 12/1991 | Mitsumori | 369/44.15 |
| 5,199,014 | 3/1993 | Homburg et al. | 359/814 |

*Primary Examiner*—Loha Ben
*Attorney, Agent, or Firm*—Limbach & Limbach; Philip M. Shaw, Jr.

[57] ABSTRACT

An objective lens driving device is provided in which a resilient supporting member supporting an objective lens holder mounting an objective lens for elastic displacement in the focusing direction and in the tracking direction has a spring constant control portion for lowering one of the first-order resonant frequency in the focusing direction and the first-order resonant frequency in the tracking direction relative to the other. The spring constant control portion is of a cross-sectional shape having one of the focusing direction and the tracking direction as the long axis. The resilient supporting member is formed by plastic deformation of a starting resilient linear material having a spring constant in the focusing direction equal to the spring constant in the tracking direction. This enables a stable control operation for the objective lens.

11 Claims, 7 Drawing Sheets

ОБЪЕКТIVE LENS DRIVING DEVICE AND
METHOD FOR PRODUCING RESILIENT
SUPPORTING MEMBER PROVIDED IN
OBJECTIVE LENS DRIVING DEVICE

BACKGROUND OF THE INVENTION

1. Field of the Invention

This invention relates to an objective lens driving device for condensing a laser light radiated from a light source, such as a semiconductor laser, onto a signal recording surface of a disc-shaped optical recording medium, such as an optical disc or a magneto-optical disc, or controlling an objective lens to cause the laser light to follow a recording track of the optical disc, and a method for producing a resilient supporting member employed in such objective lens driving device for elastically movably supporting a lens holder.

2. Description of the Related Art

Heretofore, an optical disc player, an optical reproducing apparatus or an optical recording/reproducing apparatus includes an optical pickup device for radiating a laser light on the signal recording surface of an optical disc as a recording medium for reading out information signals recorded on the optical disc or recording information signals on the signal recording surface of the optical disc as well as detecting the return light from the signal recording surface for reading out or reproducing the information signals.

Such optical pickup device includes a light source for radiating the laser light to be illuminated on the signal recording surface of the optical disc, an objective lens for condensing the laser light radiated from the laser light source on the signal recording surface of the disc, and light detectors, such as photodetectors, for detecting the return light reflected back from the signal recording surface of the optical disc and traversing the objective lens.

The optical pickup device includes an objective lens driving device for driving the objective lens highly accurately for recording information signals on a recording track of an optical disc or reading out information signals recorded with high density on the signal recording surface of the optical disc. With such objective lens driving device, the objective lens, on which the laser light is incident, is controlled highly accurately for condensing the laser light radiated from the laser light source and for causing the laser light to precisely follow the recording track on the optical disc.

That is, with the present objective lens driving device, the objective lens for condensing and illuminating the laser light on the signal recording surface of the optical disc is driven and displaced in two mutually perpendicular directions, that is in a focusing direction parallel to the optical axis of the objective lens and in a tracking direction normal to the focusing direction, on the basis of the focusing control signal and the tracking control signal. This causes the laser light to be correctly condensed on the signal recording surface of the optical disc and to correctly follow the recording track of the optical disc.

Figure 1:
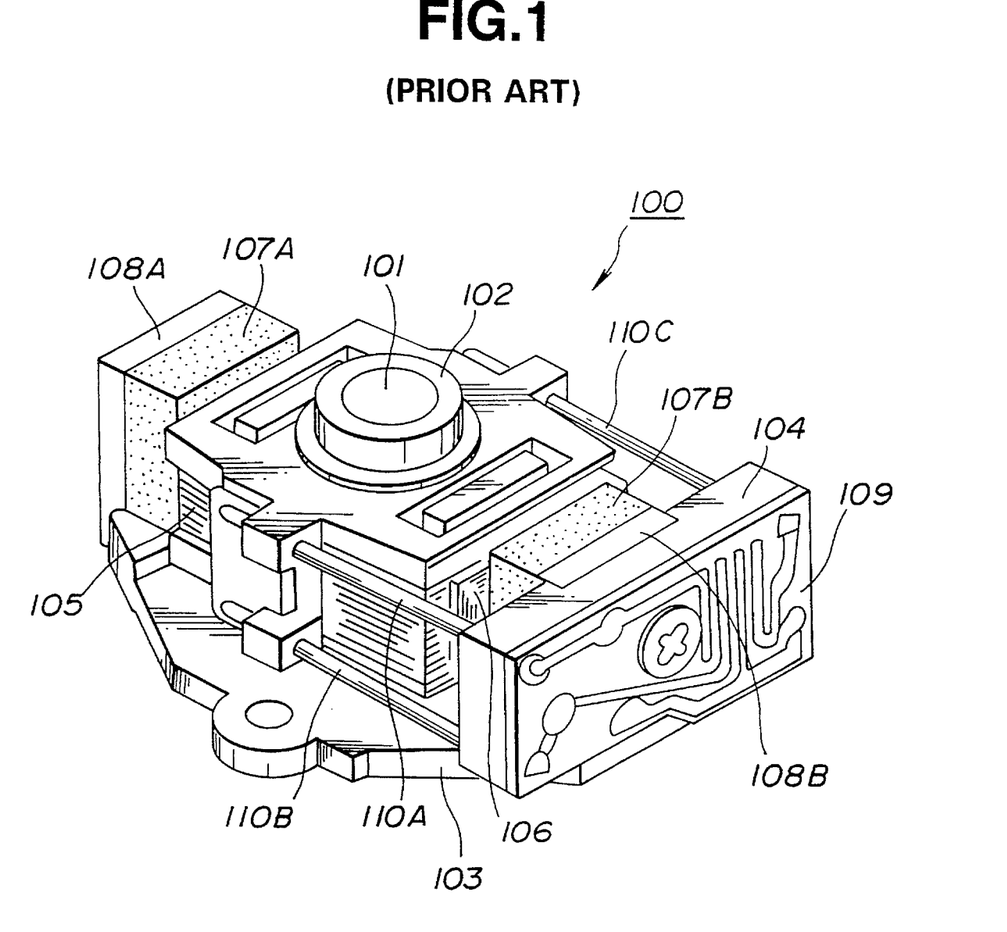
FIG. 1 is a perspective view showing a conventional objective lens driving device.

As an example of the conventional objective lens driving device, there has been known a wire-supported objective lens driving device 100 in which a tubular lens holder 102 mounting an objective lens 101 is supported in a cantilevered fashion by upper and lower and left and right paired resilient supporting members 110A to 110D, as shown in FIG. 1. Each of the four resilient supporting members 11A to 110D has its free end secured to the lens holder 102, while having its proximal end secured to a mounting plate 104 set upright on a supporting substrate 103. Consequently, the objective lens 101 is adapted for being resiliently displaced by the resilient displacement of the resilient supporting members 110A to 110D in two axial directions, namely in the direction along the optical axis and in the direction normal thereto, in unison with the lens holder 102.

The above-described conventional wire-supported type objective lens driving device 100 has an electro-magnetic driving device for driving the lens holder 102 in the focusing direction parallel to the optical axis of the objective lens 101 and in the tracking direction normal to the optical axis. The electro-magnetic driving device includes a focusing driving coil 105 placed on the outer peripheral surface of the lens holder 102, a tracking driving coil 106 joined on the focusing driving coil 105 and a magnetic circuit made up of a pair of magnets 107A, 107B arranged on the supporting substrate 103 and a pair of yokes 108A and 108B arranged facing these magnets 107A and 107B. The magnets 107A, 107B and the yokes 108A and 108B, making up the magnetic circuit, are arranged on the supporting substrate 103 for facing the focusing driving coil 105 and the tracking driving coil 106. On the mounting plate 104 is assembled a circuit substrate 109.

The above-described objective lens driving device 100 is assembled on an optical pickup unit which is made up of a laser light source and an optical system or a light sensor, with the laser light being emitted by the laser light source so as to fall on the objective lens 101. The laser light falls on the optical disc via the objective lens 101 and is thereby reflected by the signal recording surface of the disc so as to be again incident on the objective lens 101 as the return light. The optical pickup device detects by the light sensor the focusing error signal and the tracking error signal along with the information signals from the return light.

The objective lens driving device 100 is fed by a controller with the control current corresponding to the focusing error signal or the tracking error signal for driving the focusing driving coil 105 or the tracking driving coil 106. The resilient supporting members 110A to 110D are resiliently displaced in the focusing direction or in the tracking direction by such driving of the focusing driving coil 105 or the tracking driving coil 106 for displacing the objective lens mounted on the lens holder 102 in two directions, namely in the direction along the optical axis and in a direction normal thereto. By such displacement of the objective lens 101, the optical pickup unit performs focusing control and tracking control of the laser light with respect to the optical disc.

With the above-described conventional objective lens driving device 100, it may occur that, when the laser light is caused to follow the recording track of the optical disc by the focusing control and the tracking control, the lens holder 102 on which the objective lens 101 is assembled tends to be deviated significantly due to severe vibrations of the resilient supporting members 110A to 110D. It is occasionally not possible with the objective lens driving device 100 to drive the objective lens 101 correctly in the focusing direction and in the tracking direction with respect to the optical disc, such that the information signals cannot be recorded or reproduced correctly.

That is, with the resilient supporting members 110A to 110D provided on the conventional objective lens driving device 100, metal wires are generally employed which are circular in cross-section and whose spring constants in the focusing direction and in the tracking direction are equal to each other. These resilient supporting members 110A to 110D have natural first-order resonant frequencies, as determined by characteristics proper to the spring material, which are substantially equal in the focusing direction and in the tracking direction. If, with the objective lens driving device 100, the above-described focusing operation or the tracking operation is performed at a frequency comprised within the natural first-order resonant frequency proper to the resilient supporting members 110A to 110D, the resilient supporting members are vibrated in resonance at larger amplitudes thus rendering it impossible to stably control the objective lens.

The conventional practice for combatting such problem has been to connect a buffer member to the resilient supporting members 110A to 110D for shifting the first-order resonant frequency of the resilient supporting members 110A to 110D to outside the frequency range of the focusing control operation or the tracking control operation.

However, these measures lead to increased production cost of the objective lens driving device 100. In addition, the above effect cannot be achieved unless the buffer material is securely and intimately fastened to the resilient supporting members 110A to 110D. The result is that the buffer material joining operation necessitates an extremely laborious operation by a skilled operator, while it cannot be carried out on the objective lens driving device without considerable difficulties.

OBJECTS AND SUMMARY OF THE INVENTION

It is therefore an object of the present invention to provide an objective lens driving device in which the resilient supporting members are arranged for shifting the first-order resonant frequencies thereof to outside of the frequency range of the focusing control operation or the tracking control operation in carrying out the objective lens control operation.

It is another object of the present invention to provide a method for producing a resilient supporting member employed n a objective lens driving device in which the resilient supporting members are arranged for shifting the first-order resonant frequencies thereof to outside of the frequency range of the focusing control operation or the tracking control operation in carrying out the objective lens control operation.

In one aspect, the present invention provides an objective lens driving device comprising an objective lens holder having an objective lens mounted thereon, electro-magnetic driving means for driving the objective lens holder in a focusing direction parallel to the optical axis of the objective lens and in a tracking direction normal to said optical axis, and a plurality of resilient supporting members each having its one end secured to a stationary portion and having its other end secured to the objective lens holder for supporting the objective lens holder for elastic displacement in the focusing direction and in the tracking direction. At least one spring constant control portion is provided between the one end and the other end of each resilient supporting member for lowering one of the first-order resonant frequency in the focusing direction and the first-order resonant frequency in the tracking direction relative to the other.

The spring constant control portion is of a cross-sectional shape different from that of the remaining portion of the resilient supporting member. The spring constant control portion permits the resilient supporting member to be flexed more easily in the focusing direction or in the tracking direction.

The spring constant control portion is of a cross-sectional shape having the direction normal to one of the focusing direction and the tracking direction as its long axis.

Each of the resilient supporting members is formed of a linear material having such a cross-sectional shape that the spring constant in the focusing direction is substantially equal to that in the tracking direction. Each spring constant control section is of such a cross-sectional shape that the spring constant in the focusing direction is different from that in the tracking direction.

The spring constant control portion is of a cross-sectional shape having the direction normal to one of the focusing direction and the tracking direction as a long axis.

Each of the resilient supporting members is formed of a linear material having a circular cross-section, and the spring constant control portion is of a cross-sectional shape having the direction normal to one of the focusing direction and the tracking direction as its long axis.

An objective lens driving device comprises an objective lens holder having an objective lens mounted thereon, electro-magnetic driving means for driving the objective lens holder in a focusing direction parallel to the optical axis of the objective lens and in a tracking direction normal to the optical axis, and a plurality of resilient supporting members each having its one end secured to a stationary portion and having its other end secured to the objective lens holder for supporting the objective lens holder for elastic displacement in the focusing direction and in the tracking direction. Each of these resilient supporting members is formed of a linear member having such a cross-sectional shape that one of the first-order resonant frequency in the focusing direction and the first-order resonant frequency in the tracking direction is lower than the other of the first-order resonant frequency in the focusing direction and the first-order resonant frequency in the tracking direction.

Each of these resilient supporting members is formed of a linear member having such a cross-sectional shape that one of the first-order resonant frequency in the focusing direction and the first-order resonant frequency in the tracking direction is lower than the other of the first-order resonant frequency in the focusing direction and the first-order resonant frequency in the tracking direction.

Each of the resilient supporting members is of such a cross-sectional shape that the spring constant thereof in the focusing direction is different from that in the tracking direction.

Each of the resilient supporting members is of a cross-sectional shape having the direction normal to one of the focusing direction and the tracking direction as its long axis.

In another aspect, the present invention provides a method for producing a resilient supporting member provided in an objective lens driving device. The resilient supporting member has its one end secured to a stationary portion and its other end secured to an objective lens holder for supporting the objective lens holder for elastic displacement in the focusing direction and in the tracking direction. The method comprises applying pressure from at least one direction to the linear material for forming the linear material into such a cross-sectional shape that at least a portion of the linear material has a spring constant in the focusing direction different from a spring constant in the tracking direction.

A linear material at least a portion of which is of a cross-sectional shape such that the direction normal to the focusing direction or to the tracking direction is its long axis is employed as the material for the resilient supporting member.

With the above-described objective lens driving device, the spring constant control portion formed in each of plural resilient supporting members lowers the first-order resonant frequency in the focusing direction or the first-order resonant frequency in the tracking direction as compared to the other so that the first-order resonant frequencies of the resilient supporting members are shifted in their entirety to outside the frequency range of the focusing control operation or the tracking control operation. In this manner, the objective lens in the objective lens driving device is correctly displaced in the focusing direction or in the tracking direction based upon the focusing control signal or the tracking control signal for condensing the laser beam on the signal recording surface of the optical disc in order for the laser beam to correctly follow the recording track on the optical disc.

On the other hand, the resilient supporting members of the objective lens driving device are of a cross-sectional shape such that one of the first-order resonant frequency in the focusing direction and the first-order resonant frequency in the tracking direction is lower than the other, so that the first-order resonant frequencies are shifted in their entirety to outside of the frequency range of the focusing control operation or the tracking control operation. In this manner, the objective lens in the objective lens driving device is correctly displaced in the focusing direction or in the tracking direction based upon the focusing control signal or the tracking control signal for condensing the laser beam on the signal recording surface of the optical disc in order for the laser beam to correctly follow the recording track on the optical disc.

With the method for producing a resilient supporting member provided in an objective lens driving device, which resilient supporting member has its one end secured to a stationary portion and its other end secured to an objective lens holder for supporting the objective lens holder for elastic displacement in the focusing direction and in the tracking direction, the pressure is applied from at least one direction to the linear material for forming the linear material into such a cross-sectional shape that at least a portion of the linear material has a spring constant in the focusing direction different from a spring constant in the tracking direction, so that the first-order resonant frequencies are shifted in their entirety to outside of the frequency range of the focusing control operation or the tracking control operation. In this manner, the objective lens in the objective lens driving device is correctly displaced in the focusing direction or in the tracking direction based upon the focusing control signal or the tracking control signal for condensing the laser beam on the signal recording surface of the optical disc in order for the laser beam to correctly follow the recording track on the optical disc.

In sum, with the objective lens driving device according to the present invention, each of the resilient supporting members supporting the objective lens holder mounting the objective lens for elastic displacement in the focusing direction and in the tracking direction is formed with spring constant control portions whereby the first-order resonant frequency of the resilient supporting member in the focusing direction or the first-order resonant frequency of the resilient supporting member in the tracking direction is set so as to be lower than the other, whereby the first-order resonant frequencies of the resilient supporting members in their entirety are moved to outside of the frequency range of the resilient supporting members. Consequently, resonant vibrations are prevented from being produced during the control operation of the objective lens thus enabling the objective lens to be moved in stability in both the focusing direction and the tracking direction based upon the focusing control signal or the tracking control signal. Thus the laser beam is correctly condensed on the signal recording surface of the optical disc and caused to follow the recording track of the optical disc for assuring high precision recording/reproduction of information signals.

With the objective lens driving device according to the present invention, each of the resilient supporting members supporting the objective lens holder mounting the objective lens in the focusing direction and in the tracking direction for elastic displacement is of a cross-sectional shape such that the first-order resonant frequency in the focusing direction is different from that in the first-order resonant frequency. Thus the first-order resonant frequencies of the resilient supporting members in their entirety are moved to outside of the frequency range of the resilient supporting members. Consequently, resonant vibrations are prevented from being produced during the control operation of the objective lens for correctly displacing the objective lens in stability in both the focusing direction and the tracking direction based upon the focusing control signal or the tracking control signal. Thus the laser beam is correctly condensed on the signal recording surface of the optical disc and caused to follow the recording track of the optical disc for assuring high precision recording/reproduction of information signals.

With the method for producing the resilient supporting member provided on the objective lens driving device according to the present invention, the resilient supporting member is formed of an inexpensive linear member having the spring constant in the focusing direction substantially equal to that in the tracking direction, and these linear members are plastic-worked for producing the resilient supporting member having a cross-section having a spring constant in the focusing direction different from the spring constant in the tracking direction. Thus, by employing these resilient supporting members, the meritorious effect as depicted above may be achieved.

DESCRIPTION OF THE PREFERRED EMBODIMENT

Referring to the drawings, a preferred embodiment of the present invention will be explained in detail. An objective lens driving device 1 of the embodiment illustrated is built into an optical pickup unit having an optical system including a beam splitter and a multiple lens system or a light detector. The optical pickup unit radiates a laser light beam outgoing from a laser light source to an objective lens 2 driven in a controlled manner by the objective lens driving device 1. The laser light beam is condensed and radiated by an objective lens 2 on the signal recording surface of an optical disc loaded on a reproducing apparatus fitted with the optical pickup unit. The laser light beam is reflected by the signal recording surface of the optical disc and returned so as to be again incident on the objective lens 2 as a return laser light beam.

The optical pickup unit separates the return laser beam from the objective lens 2 by a beam splitter and detects difference components in the incident laser beam and the return laser beam along the focusing direction parallel to the optical axis of the objective lens 2 and along the focusing direction normal to the optical axis by the light detector. The detected difference components in the light beam in the focusing direction and the light beam in the tracking direction are supplied as focusing error signal or tracking error signal to the objective lens driving device 1.

The objective lens driving device 1 thus drives the objective lens 2 by the control signals corresponding to the focusing error signal and the tracking error signal produced from the return laser light. The objective lens 2 is controlled to follow the recording track of the optical disc by the focusing control operation in a direction parallel to the optical axis and by the tracking control operation in a direction normal to the optical axis.

Figure 2:
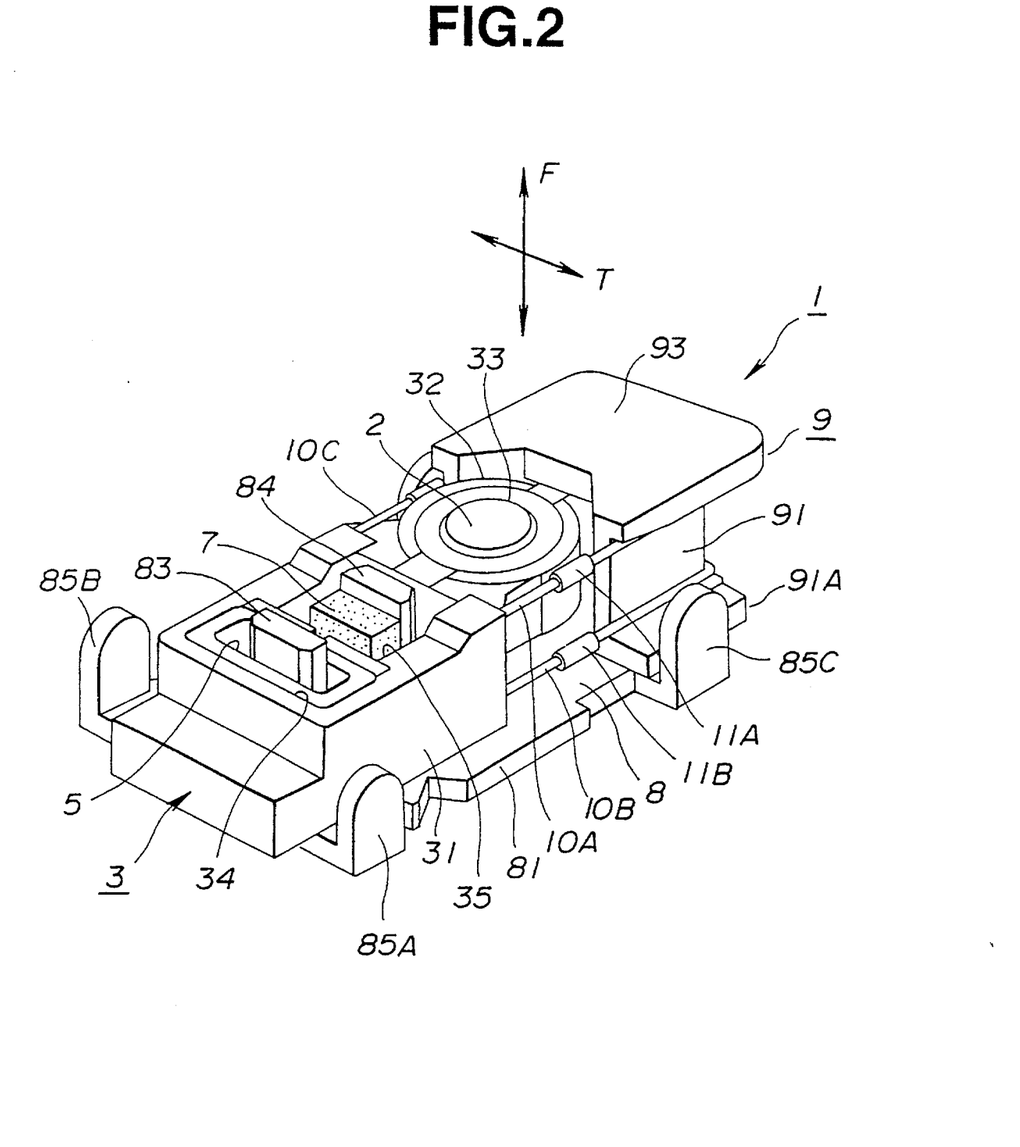
FIG. 2 is a perspective view showing an embodiment of an objective lens driving device according to the present invention.
Figure 3:
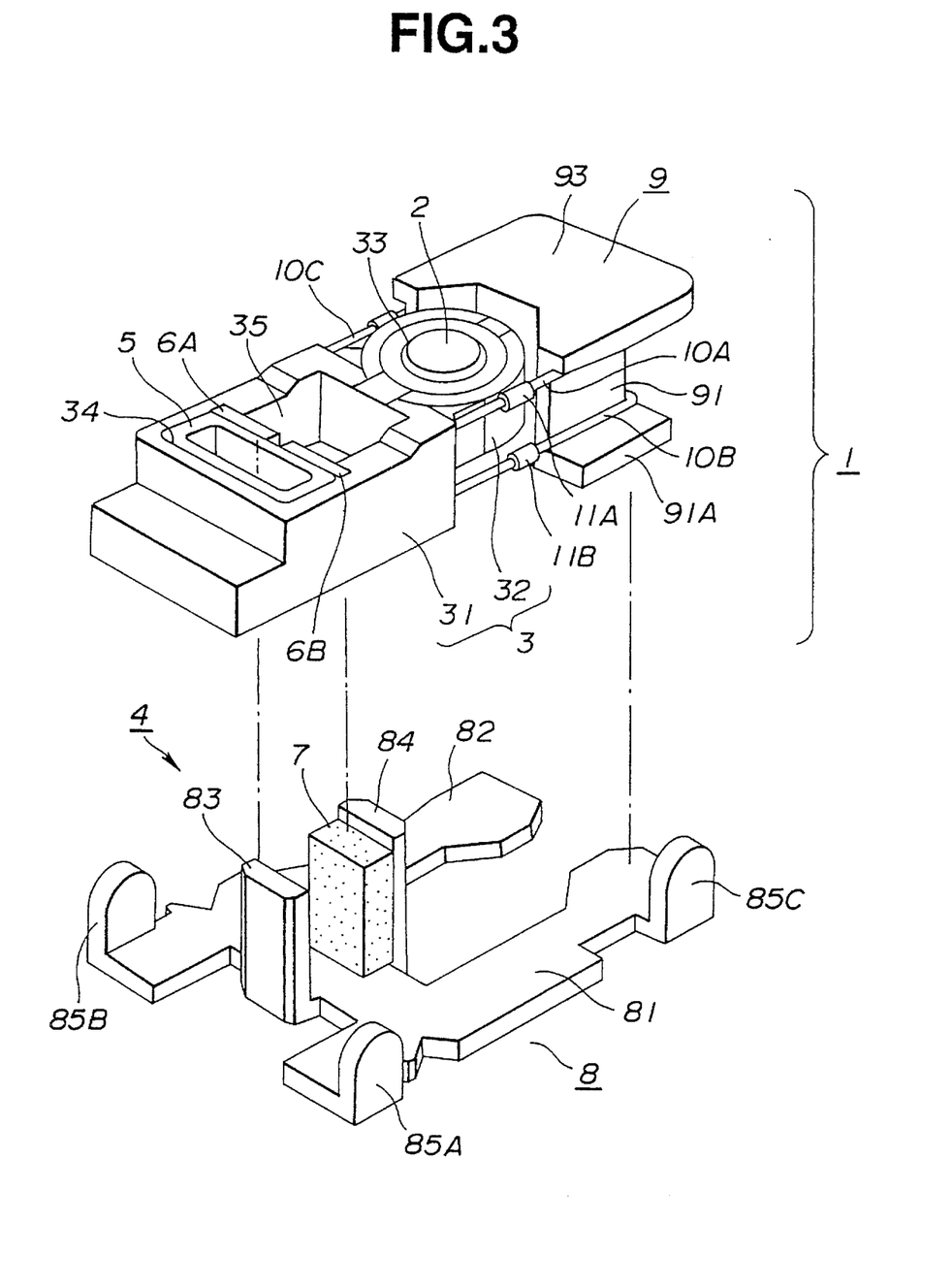
FIG. 3 is an exploded perspective view of the objective lens driving device shown in FIG. 2.
Figure 4:
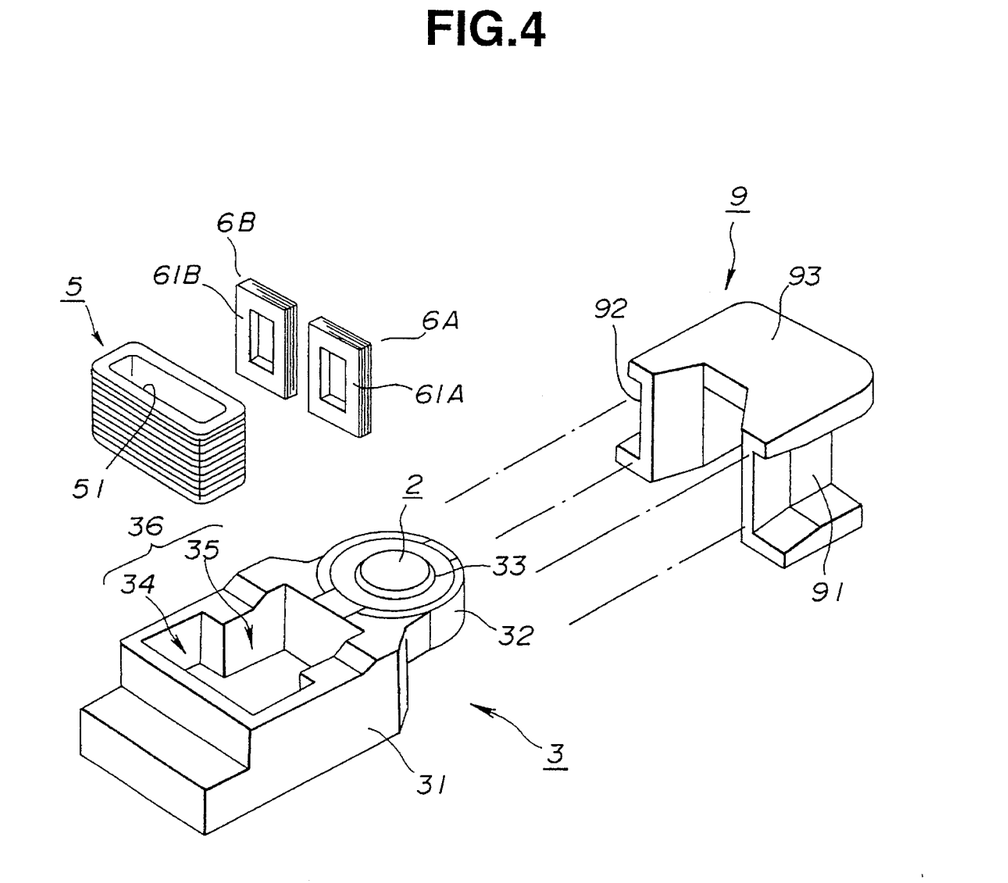
FIG. 4 is an exploded perspective view showing essential parts of the objective lens driving device shown in FIG. 2.

The objective lens driving device 1 is made up mainly of the objective lens 2, constituting a part of the optical system, an objective lens holder 3 on which the objective lens 2 is held, a focusing coil 5, a pair of tracking coils 6A, 6B, a magnet 7, a yoke member 8, a support holder 9 and resilient supporting members 10A to 10D, as shown in FIGS. 2 to 4. The focusing coil 5 and the tracking coils 6A, 6B make up electro-driving means 4 for driving the objective lens 2 in the focusing direction and in the tracking direction.

The objective lens holder 3 is formed of a synthetic material and is made up of a bobbin portion 31 substantially in the from of a square tube and a substantially cylindrical lens holder portion 32 formed as one with the lateral surface of the bobbin portion 31. The objective lens 2 is mounted in a lens through-hole 33 extending along the height of the lens holder 32. The bobbin portion 31, formed adjacent to the lens holder portion 32, has a substantially convex-shaped coil mounting through-hole 36 extending along the height of the lens holder 32. The coil mounting through-hole 36 is made up of a rectangular large-diameter portion 34 and a substantially square-shaped lesser diameter portion 35 communicating with each other and having their widths aligned with the longitudinal direction. The coil mounting through-hole 36 and the lens through-hole 33 run parallel to each other. The larger-diameter portion 34 and the lesser-diameter portion 35 of the coil-mounting through-hole 36 constitute the coil mounting portion and the portion traversed by the yoke, respectively.

The focusing coil 5 is placed on the outer surface of a bobbin 41 having substantially the same height as the height of the bobbin portion 31 of the objective lens holding member 3. The focusing coil 5 is built in the larger-diameter portion 34 of the bobbin portion 31 so that the coil winding direction is parallel to the optical axis of the objective lens 2 mounted in the lens holder 32. When built in the larger-diameter portion 34, the focusing coil 34 is bonded as one to the bobbin portion 31 by the inner wall of the larger diameter portion 34 and the opposite outer peripheral surface portion being bonded together by an adhesive.

Each of the tracking coils 6A, 6B is formed by placing a winding on the outer periphery of the bobbin portions 61A, 61B each being in the form of flat square tube. Each of these tracking coils 6A, 6B has the longitudinal size substantially equal to the height of the bobbin portion 31 of the objective lens holder 3, and has the width slightly less than the longitudinal size of the larger diameter portion 34. The tracking coils 6A, 6B are positioned at the boundary between the larger diameter portion 34 and the lesser diameter portion 35 and are bonded to one lateral surface of the focusing coil 5 with an adhesive so as to be mounted on the bobbin portion 31 of the objective lens holder 3. When the tracking coils 6A, 6B are mounted in the lager diameter portion 34 of the bobbin portion 31, the winding direction of the tracking coils is normal to the optical axis of the objective lens 2 built in the lens holder 32.

The yoke member 8 is formed of a high permeability metal plate, such as a silicon steel plate, substantially in the form of a letter H, as shown in FIG. 3. Yoke pieces 83, 84 are formed upright on both lateral side edges of a connecting portion 83 interconnecting both lateral side lobes 81, 82. The yoke member 8 is built in the optical pickup unit with the space delimited by the lateral side lobes 81, 82 and the connecting portion 83 serving as a light path for the laser beam. The yoke pieces 83, 84 are formed on the connecting portion 83 with an interval from each other such that the yoke pieces are passed through the larger diameter portion 34 and the lesser diameter portion 35 of the coil mounting through-hole 36 of the object lens holder 3. The lateral side edges of the lateral side lobes 81, 82 of the yoke member 8 are formed with upstanding connecting portions 85A, 85B and 85C connecting to the controller, not shown, for supplying the driving current to the focusing coil 5 and the tracking coils 6A, 6B.

In an assembled state of component parts of the objective lens driving device 1, the yoke piece 83 traverses the focusing coil 5 assembled in the large-diameter portion 34 of the objective lens holder 3. The opposite side yoke piece 84 traverses the small diameter portion 35 of the objective lens holder 3. When the yoke piece 84 traverses the small-diameter portion 35, the magnet 7 is mounted astride the tracking coils 6A, 6B mounted side-by-side along the width of the device 1.

The support holder 9 is formed of a synthetic material as a downward directed U-shaped member made up of lateral surface sections 91, 92 and a top plate 93. The support holder 9 is mounted as one on the yoke member 8 by having legs 91A, 92A of the lateral side sections 91, 92 joined to both lateral side lobes 81, 82 of the yoke member 8. Between the yoke member 8 and the support holder 9 is defined a light path of the laser light beam travelling from the laser light source to the objective lens 2 in the assembled state of the yoke member and the support holder.

On the lateral surface section 91 of the support holder 9 are secured one ends of resilient supporting members 10A, 10B vertically spaced apart from each other. On the opposite lateral surface section 92 of the support holder 9 are secured one ends of resilient supporting members 10C, 10D vertically spaced apart from each other. These resilient supporting members 10A to 10D are formed of a sufficiently elastic material and have their opposite ends secured to lateral sides of the objective lens holder 3. Thus the objective lens holder 3 is supported for elastic displacement on the support holder 9 via the resilient supporting members 10A to 10D. The objective lens holder 3 or the support holder 9 is formed with engaging recesses, not shown, for being engaged by the ends of the resilient supporting members 10A to 10D for securing them in position.

The resilient supporting members 10A to 10D are formed of a linear elastic material, such as piano wire, which is lightweight and has a sufficient mechanical strength. The resilient supporting member 10A and the resilient supporting member 10C, disposed on the upper side in FIG. 2, are unified at their proximal ends by a connection portion equal in length to the width of the support holder 9 so as to be substantially U-shaped in their entirety. The resilient supporting member 10B and the resilient supporting member 10D, disposed on the lower side in FIG. 2, are similarly unified at their proximal ends by a connection portion equal in length to the width of the support holder 9 so as to be substantially U-shaped in their entirety.

These resilient supporting members 10A to 10D are secured to the objective lens holder 3 and the support holder 9 by bonding or by ultrasonic welding with the connecting portions encircling the outer periphery of the objective lens holder 3 and the support holder 9. In such case, the resilient supporting members 10A and 10C are secured to the objective lens holder 3 and the support holder 9, while the resilient supporting members 10B and 10D are secured to the objective lens holder 3 and the support holder 9 in a plane running parallel to the plane in which are disposed.

The resilient supporting members 10A to 10D may be secured on the connection portion sides and on the opposite sides to the objective lens holder 3 or the support holder 9 by insert molding and by bonding or ultrasonic welding instead of being secured in their entirety by bonding or by ultrasonic welding. Alternatively, the resilient supporting members 10A to 10D may be secured to the objective lens holder 3 and the support holder 9 by insert molding at the time of simultaneously molding the objective lens holder 3 and the support holder 9. Still alternatively, the resilient supporting members 10A to 10D may also be formed by separate members which may be secured to the resilient supporting members 10A to 10D by any of the above-mentioned securing methods.

The resilient supporting members 10A to 10D are formed with spring constant control portions 11A to 11D between the objective lens holder 3 and the support holder 9. These spring constant control portions 11A to 11D are provided between the objective lens holder 3 and the support holder 9 as portions shaped to have different spring constants in the focusing direction and in the tracking direction. That is, these spring constant control portions 11A to 11D are of such a cross-sectional shape as to be dimensioned differentially in the focusing and tracking directions.

Figure 5:
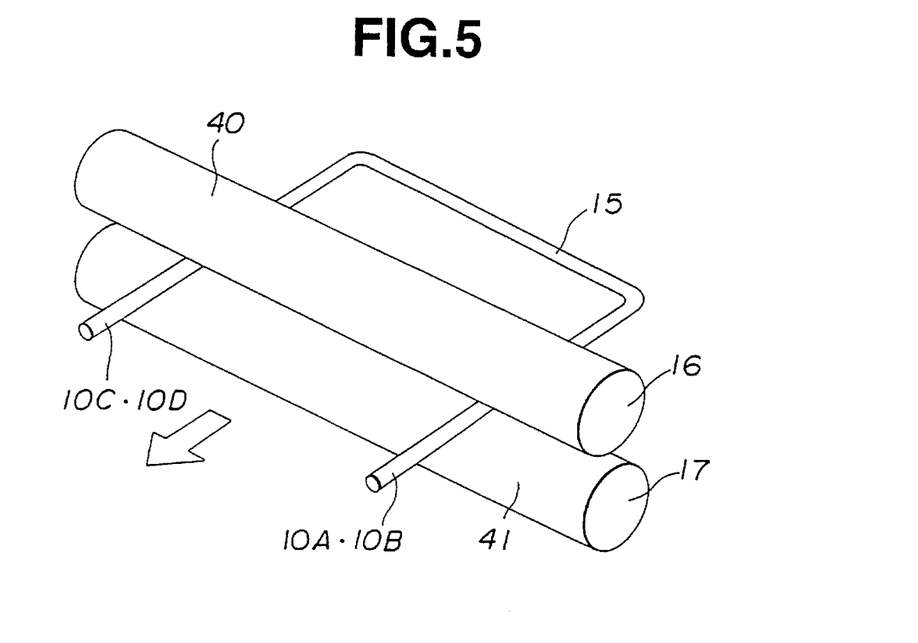
FIG. 5 is a perspective view schematically illustrating the method for producing the resilient supporting member provided on the objective lens driving device shown in FIG. 2, and showing the process of rolling a piano wire as a starting material for forming a spring constant control portion.
Figure 6:
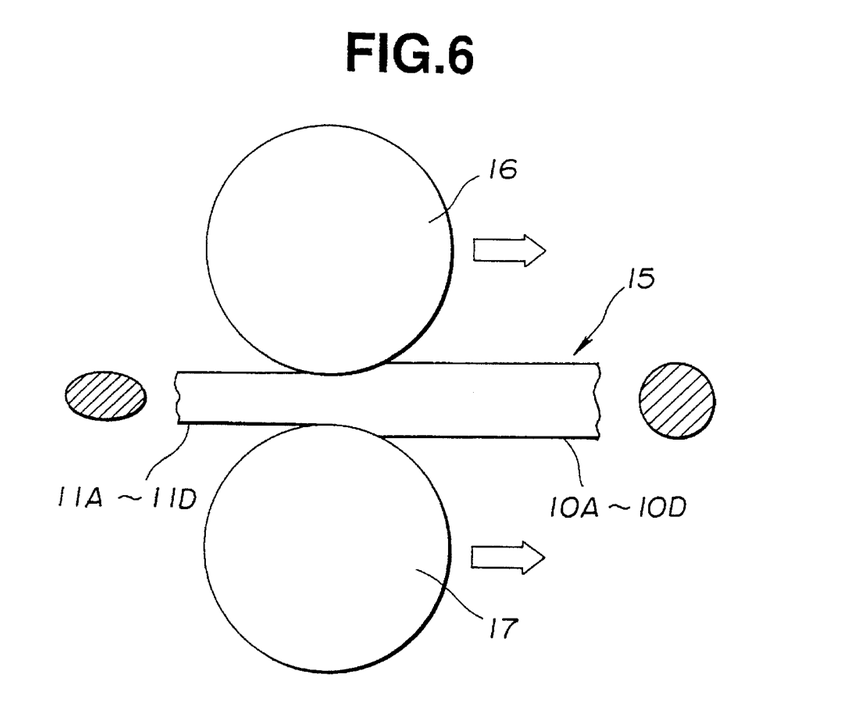
FIG. 6 is a schematic view showing the state of shape change of the piano wire incurred by rolling.

The starting material of the resilient supporting members 10A to 10D, that is the piano wire, is of a uniform circular cross-sectional shape, and has a constant spring constant in the focusing and tracking directions and an intrinsic natural first-order resonant frequency. For forming the spring constant control portions 11A to 11D, the piano wire is bowed in a U-shape and rolled by a pair of press rolls 16, 17 spaced apart from each other at an interval lesser than the diameter of the piano wire 15. As the piano wire 15 is introduced into the space between the press rolls 16, 17, it is crushed in the tracking direction, such that, beginning from the circular cross-sectional shape, it assumes an elliptical shape having its long axis extending in the tracking direction, as shown in FIG. 6.

Figure 7:
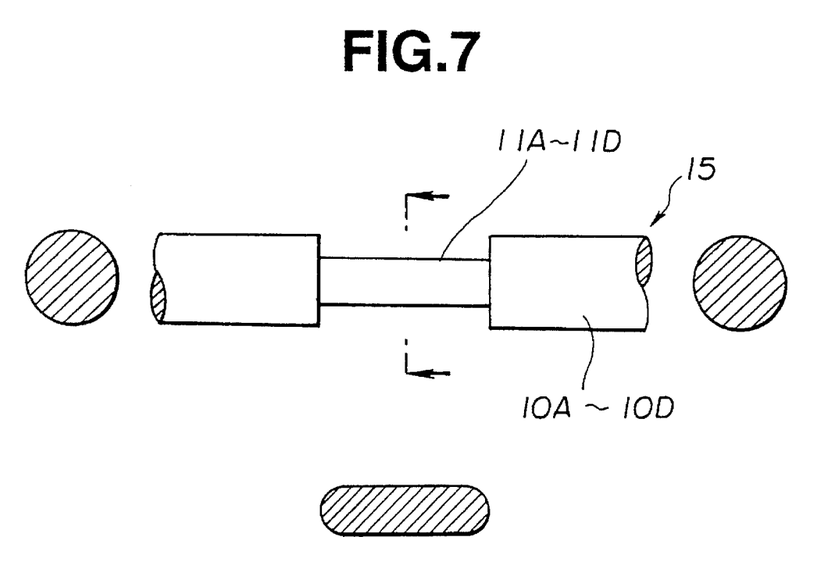
FIG. 7 is a schematic view showing another method for producing a resilient supporting member provided on the objective lens driving device, and showing the method of forming a spring constant control portion by press working a piano wire as a starting material.
Figure 8:
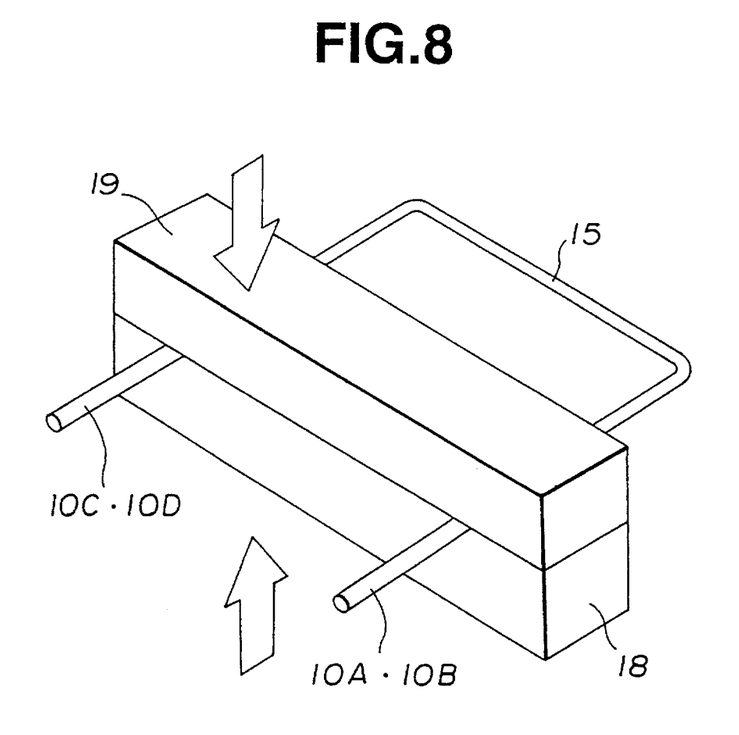
FIG. 8 is a schematic side view showing the shape of a resilient supporting member on which the spring constant control portion is formed by the press working.

The above-mentioned method of employing the press rolls 16, 17 is effective in forming the spring constant control portions 11A to 11D along an axially longer area of the piano wire 15. The spring constant control portions 11A to 11D may be formed at pre-set portions of the resilient supporting members 10A to 10D, as will be explained subsequently. The piano wire 15, bowed to a U-shape, may also be press-worked using a rectangular die 18 and a rectangular punch 19 for forming the spring constant control portions 11A to 11D, as shown in FIG. 8.

That is, the piano wire 15 is crushed by the punch 19, as the piano wire is placed on the die 18, for forming the spring constant control portions 11A to 11D. That is, a pre-set portion of each of the resilient supporting members 10A to 10D is crushed in the tracking direction for a length equal to the width of each of the die 18 and the punch 19, as shown in FIG. 8. That is, the spring constant control portions 11A to 11D, formed by the press-working, are formed by the portions of the resilient supporting members 10A to 10D crushed by the press-working from the circular cross-sectional shape to an elliptical cross-sectional shape.

Figure 9:
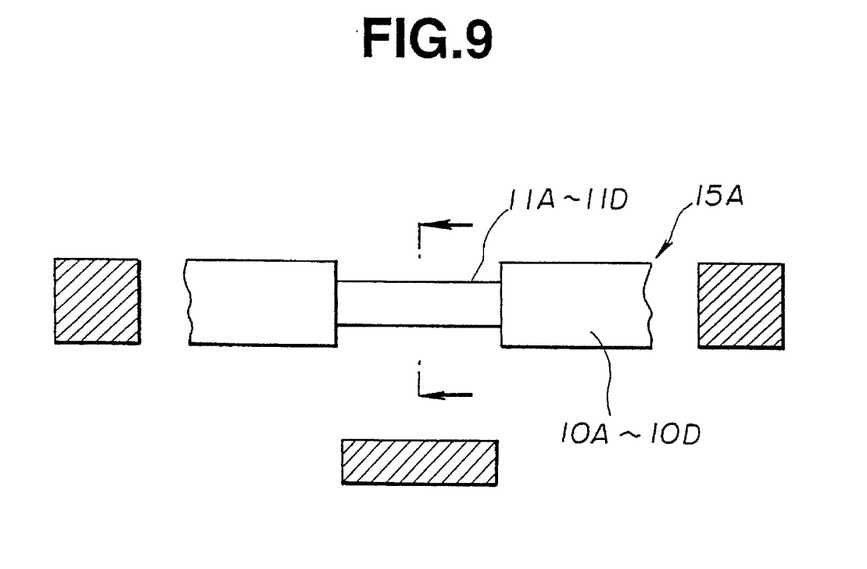
FIG. 9 is a schematic side view showing the shape of the resilient supporting member produced from a linear material of a square cross-section as a starting material.

The starting material of the resilient supporting members 10A to 10D may also be a resilient linear member 15A having a square cross-section, as shown in FIG. 9, instead of being the above-mentioned piano wire 15 having the circular cross-section. The linear member 15A, having the square cross-section, is of a constant spring constant in both the focusing direction and in the tracking direction and of an intrinsic natural first-order resonant frequency. The linear member 15A is press-worked by the press rolls 16, 17 or the die 18 and the punch 19 so as to form the spring constant control portions 11A to 11D having a rectangular cross-section having the tracking direction as the longitudinal direction.

The above description has been made of the case of forming the spring constant control portions 11A to 11D in the linear member 15 so that the spring constant control portions 11A to 11D are of a cross-sectional shape having the tracking direction as the long axis. However, by roll-working with the linear member rotated 90° about its axis, the spring constant control portions 11A to 11D may also be formed to have the cross-sectional shape having the focusing direction as the long axis.

Figure 10:
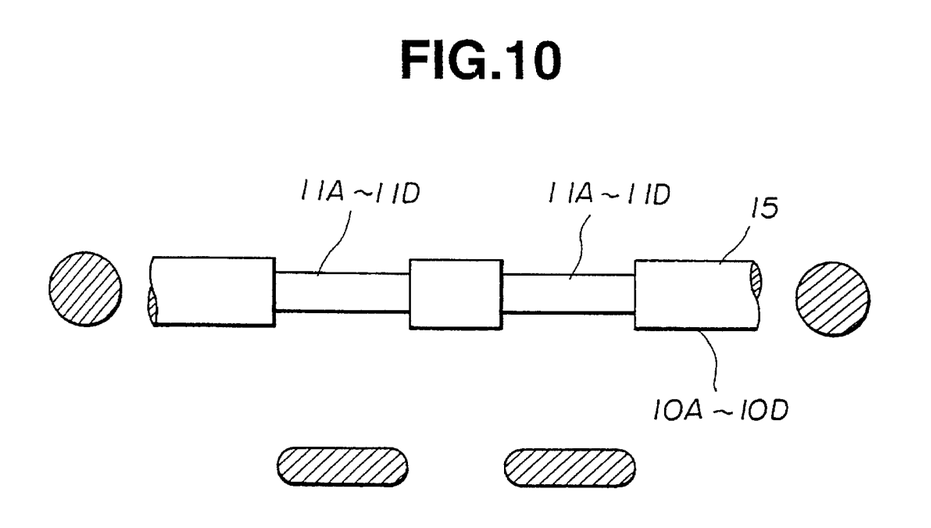
FIG. 10 is a schematic side view showing the shape of an alternative resilient supporting member having a plurality of spring constant control portions.

The linear member 15 may also be formed with plural spring constant control portions 11A to 11D, as shown in FIG. 10. The above-mentioned press-working employing the die 18 and the punch 19 may be effectively employed for forming the plural spring constant control portions 11A to 11D.

If the resilient supporting members 10A to 10D are formed with the spring constant control portions 11A to 11D having the cross-section having the tracking direction as the long axis, these spring constant control portions 11A to 11D tend to be flexed more significantly in the focusing direction than in the tracking direction. By the resilient supporting members 10A to 10D having the spring constant control portions 11A to 11D, the resilient supporting members 10A to 10D are constructed so as to have differential first-order resonant frequencies in the focusing direction and in the tracking direction. The first-order resonant frequencies in the focusing direction and in the tracking direction may easily be changed depending on the cross-sectional shape and the length of the spring constant control portions 11A to 11D.

With the above-described objective lens driving device 1, when the focusing coil 5 is fed with the driving current corresponding to the focusing error signal, a magnetic driving force displacing the objective lens holder 3 in a direction parallel to the objective lens 2 is generated by the current flowing in the focusing coil 5 and the magnetic flux emanating from the magnet 7. Such magnetic driving force elastically displaces the resilient supporting members 10A to 10D in a focusing direction parallel to the optical axis of the objective lens 2 indicated by an arrow F in FIG. 2. Thus, the objective lens holder 3 is moved in the focusing direction for displacing the objective lens 2 in a direction into and out of contact with the signal recording surface of the optical disc for condensing the incident laser light beam on the signal recording surface.

When one of the tracking coils 6a, 6B is fed with the driving current corresponding to the tracking error signal, a magnetic driving force displacing the objective lens holder 3 in a direction normal to the objective lens 2 is generated by the current flowing in the tracking coils 6A, 6B and the magnetic flux emanating from the magnet 7. Such magnetic driving force flexibly displaces the resilient supporting members 10A to 10D in the left or right tracking direction normal to the optical axis of the optical axis of the objective lens 2 indicated by an arrow T in FIG. 2. Thus the objective lens holder 3 is displaced in the left tracking direction or in the right tracking direction for causing the objective lens 2 to follow correctly the recording track of the optical disc for condensing the incident laser light on the recording track.

With the objective lens driving device of the embodiment illustrated, resonant vibrations of the resilient supporting members 10A to 10D supporting the objective lens holder 3 for resilient displacement may be eliminated by providing the spring constant control portions 11A to 11D. That is, if the piano wire 15 having the circular cross-section is directly employed for the resilient supporting members 10A to 10D, the resilient supporting members 10A to 10D have the same natural first-order resonant frequency in the focusing and tracking directions. By forming the spring constant control portions 11A to 11D in the resilient supporting members 10A to 10D, the focusing control operation or the tracking control operation for the objective lens 2 occurs in a frequency outside of the range of the resonant frequency even if such operation occurs within the natural resonant frequency of the resilient supporting members 10A to 10D. Consequently, the objective lens holder 3 may be displaced by the focusing control operation or the tracking control operation of the objective lens 2 in the focusing or tracking direction in a stable state as a result of elimination of resonant vibrations of the resilient supporting members 10A to 10D.

Consequently, the objective lens 2 is displaced in a direction towards and away from the signal recording surface of the optical disc on he basis of the focusing error signal for condensing the incident laser light on the signal recording surface. On the other hand, the objective lens 2 is displaced to follow correctly the recording track of the optical disc on the basis of the tracking error signal for condensing the incident laser light on the recording track. By such precise control for the objective lens 2, it becomes possible for the object lens driving device 1 to reproduce correctly the information signals recorded on the optical disc 2.

The present invention is not limited to the above-described objective lens driving device and may be applied for example to an objective lens driving device provided on an optical pickup unit having a magnetic head facing the objective lens 2 with an optical disc in-between and adapted not only for reproducing information signals from the optical disc but also for recording information signals on the signal recording surface of the optical disc.

What is claimed is:

1. An objective lens driving device comprising:
   an objective lens holder having an objective lens mounted thereon,
   electro-magnetic driving means for driving the objective lens holder in a focusing direction parallel to an optical axis of the objective lens and in a tracking direction normal to said optical axis, and
   a plurality of resilient supporting members each having its one end secured to a stationary portion and having its other end secured to said objective lens holder for supporting said objective lens holder for elastic displacement in the focusing direction and in the tracking direction,
   wherein the improvement comprises
      at least one spring constant control portion between the one end and the other end of each resilient supporting member for lowering one of a first-order resonant frequency in the focusing direction and a first-order resonant frequency in the tracking direction relative to another of the first-order resonant frequency in the focusing direction and the first-order resonant frequency in the tracking direction.

2. The objective lens driving device as claimed in claim 1, wherein said spring constant control portion is of a cross-sectional shape different from that of the remaining portion of the resilient supporting member, said portion permitting the resilient supporting member to be flexed more easily in the focusing direction or in the tracking direction.

3. The objective lens driving device as claimed in claim 2, wherein said spring constant control portion is of a cross-sectional shape having the direction normal to one of the focusing direction and the tracking direction as a long axis.

4. The objective lens driving device as claimed in claim 1, wherein each of the resilient supporting members is formed of a linear material having such a cross-sectional shape that the spring constant in the focusing direction is substantially equal to that in the tracking direction, and wherein each spring constant control section is of such a cross-sectional shape that the spring constant in the focusing direction is different from that in the tracking direction.

5. The objective lens driving device as claimed in claim 4, wherein said spring constant control portion is of a cross-sectional shape having the direction normal to one of the focusing direction and the tracking direction as a long axis.

6. The objective lens driving device as claimed in claim 1 wherein each of the resilient supporting members is formed of a linear material having a circular cross-section, and wherein said spring constant control portion is of a cross-sectional shape having a direction normal to one of the focusing direction and the tracking direction as a long axis.

7. An objective lens driving device comprising an objective lens holder having an objective lens mounted thereon, electro-magnetic driving means for driving the objective lens holder in a focusing direction parallel to an optical axis of the objective lens and in a tracking direction normal to said optical axis, and a plurality of resilient supporting members each having its one end secured to a stationary portion and having its other end secured to said objective lens holder for supporting said objective lens holder for elastic displacement in the focusing direction and in the tracking direction, wherein the improvement resides in that each of these resilient supporting members is formed of a linear member having such a cross-sectional shape that one of a first-order resonant frequency in the focusing direction and a first-order resonant frequency in the tracking direction is lower than another of the first-order resonant frequency in the focusing direction and the first-order resonant frequency in the tracking direction.

8. The objective lens driving device as claimed in claim 7, wherein each of the resilient supporting members is of such a cross-sectional shape that the spring constant thereof in the focusing direction is different from that in the tracking direction.

9. The objective lens driving device as claimed in claim 8, wherein each of the resilient supporting members is of a cross-sectional shape having a direction normal to one of the focusing direction and the tracking direction as its long axis.

10. A method for producing a resilient supporting member provided in an objective lens driving device, said resilient supporting member having its one end secured to a stationary portion and its other end secured to an objective lens holder for supporting the objective lens holder for elastic displacement in the focusing direction and in the tracking direction, comprising:

employing a linear material permitting plastic working and being of a cross-sectional shape such that the spring constant in the focusing direction is substantially equal to the spring constant in the tracking direction, and applying pressure from at least one direction to said linear material for forming said linear material into such a cross-sectional shape that at least a portion of said linear material has a spring constant in the focusing direction different from a spring constant in the tracking direction.

11. The method as claimed in claim 10, wherein a linear material, at least a portion of which is of a cross-sectional shape such that a direction normal to the focusing direction or to the tracking direction is its long axis, is employed as the material for the resilient supporting member.

* * * * *